: 3,554,879
Patented Jan. 12, 1971

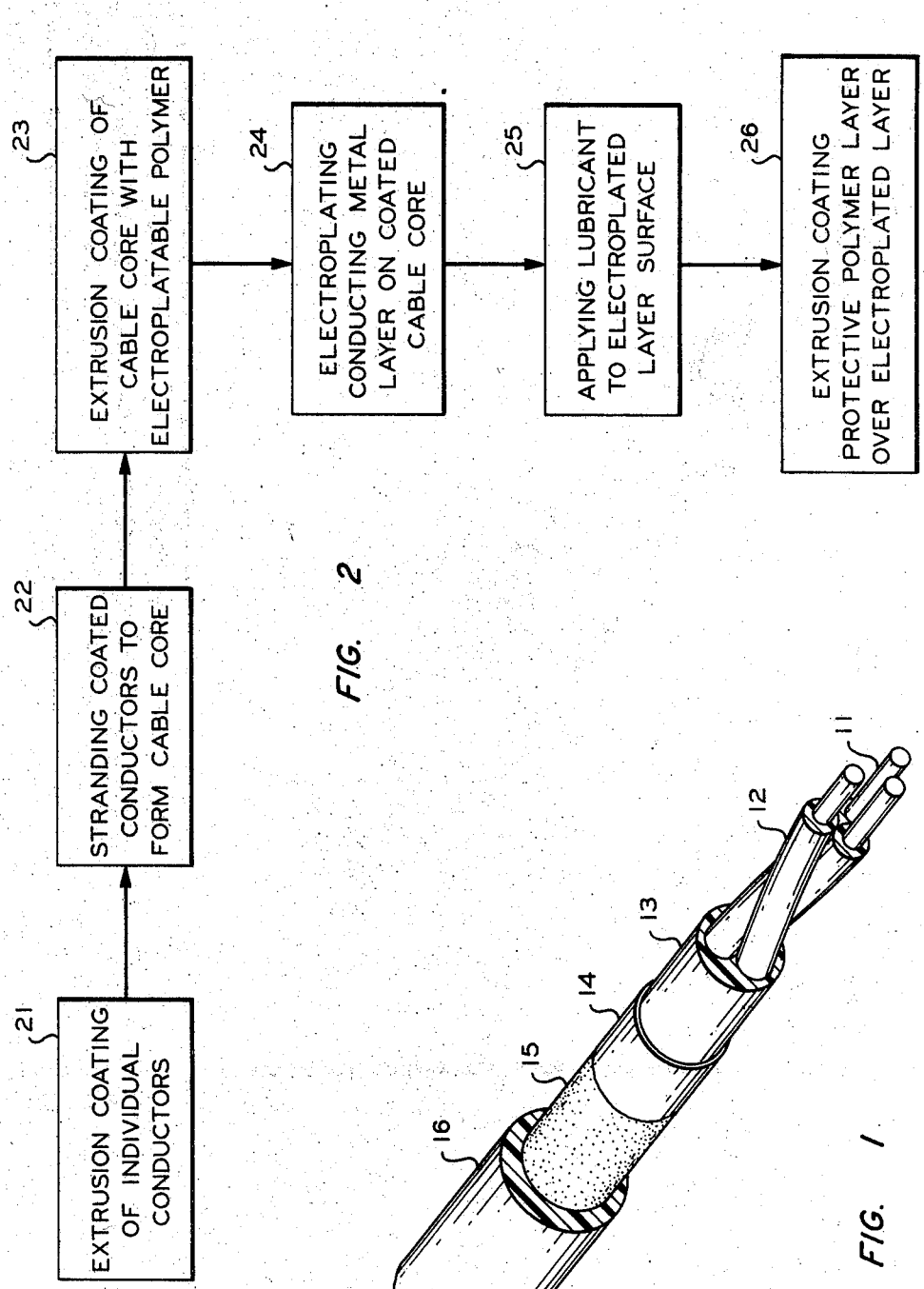

3,554,879
ELECTROPLATING METAL SHIELD ON ELECTRICAL CABLE
James A. Shotton and Roy E. Stansbury, Bartlesville, Okla., assignors to Phillips Petroleum Company, a corporation of Delaware
Filed Feb. 29, 1968, Ser. No. 709,356
Int. Cl. C23b 5/50, 5/58
U.S. Cl. 204—28                                  6 Claims

ABSTRACT OF THE DISCLOSURE

A cable core of one or more electrical conductors is covered by an electroplatable copolymer of at least one monoolefin and at least one diolefin or a block copolymer of a major amount of at least one monovinyl-substituted aromatic compound and a minor amount of at least one conjugated diene. A metal layer is electroplated on the outer surface of the polymer to form an electrical shield for the cable core. The electroplated layer is covered with a protective polymer layer, the latter preferably being separated from the electroplated layer by a lubricant to prevent bonding of the protective polymer layer to the electroplated layer.

---

This invention relates to shielded cable for transmitting high frequency electrical signals.

In the past, it has been common to braid a shielding sleeve for an electrical conductor or to form the shielding sleeve by longitudinally folding a laminated tape of a metal foil and an insulating plastic material about the cable core. The braided shield is more expensive and has a higher resistance at high frequencies than the folded tape shield. However, the folded tape shield is subject to the separation of the edges of the tape during the bending of the cable, thus producing holes in the electrical shield.

It has been discovered that many of these disadvantages can be minimized through the utilization of a shield which is electroplated onto a layer of an electroplatable copolymer of at least one monoolefin and at least one diolefin or a block copolymer of a major amount of at least one monovinyl-substituted aromatic compound and a minor amount of at least one conjugated diene which covers the cable core. The electroplated shield can be mechanically protected by covering it with a layer of a mechanically strong polymer.

Accordingly, it is an object of the invention to provide a new and improved shielded cable for transmitting electrical signals. It is also an object of the invention to provide a novel and improved method for fabricating a shielded cable.

Other objects, aspects and advantages of the invention will be apparent from a study of the specification, the drawings and the appended claims to this invention.

In the drawings, FIG. 1 is a perspective view in cross section of a shielded cable in accordance with the invention, and FIG. 2 is a diagrammatic representation of the steps in the fabricating of a shielded cable in accordance with the process of the invention.

Referring now to FIG. 1 electrical conductors 11 are provided with individual insulation coatings 12. The insulated conductors can be stranded or twisted to form the cable core. The cable core is covered by a layer 13 of an electroplatable copolymer of at least one monoolefin and at least one diolefin or a block copolymer of a major amount of at least one monovinyl-substituted aromatic compound and a minor amount of at least one conjugated diene. A layer 14 of a metal conductor is electroplated on the outer surface of layer 13 to form a continuous electrical shield for the cable core. A lubricant or slip agent 15 is coated onto the outer surface of the electroplated layer 14, and an overall protective sheath 16 is formed over the lubricant layer 15. Conductors 11 can be of any suitable electrical conducting material, with copper, aluminum and silver being the presently preferred materials. Insulation layers 12 can be of any suitable electrical insulation material, such as paper, textile fabric, synthetic thermoplastic materials and the like, but synthetic thermoplastic materials are presently preferred. Examples of suitable synthetic thermoplastic materials include polymers of at least one mono-1-olefin having from 2 to 10 carbon atoms per molecule, such as polyethylene, polypropylene, polybutene, copolymer of ethylene and propylene, copolymer of ethylene and butene, copolymers of ethylene and hexene, and the like; polymers of vinyl chloride and copolymers of vinyl chloride and at least one suitable comonomer, polystyrene and polymers of other vinyl monomers, polyamides or nylon, polyesters of carbonic acid or polycarbonates, polyphenylene oxide resins, polyphenylene sulfide resins, and polysulfones. The individual insulation layers 12 can be extrusion coated onto conductors 11 in step 21 (FIG. 2) by techniques well known in the art. The individually coated conductors can then be stranded or twisted in step 22 to form the cable core. The cable core is passed to step 23 wherein it is extrusion coated by any of the known techniques with an electroplatable polymer. Electroplatable polymers of the invention include at least one polymer selected from the group consisting of (1) copolymers of at least one aliphatic 1-olefin having 2 to 10 carbon atoms per molecule and no branching nearer the double bond than the 4-position with at least one diolefin having at least one terminal double bond and 4 to 10 carbon atoms per molecule, the diolefin being used in an amount to result in at least two trans-internal double bonds per thousand carbon atoms of the copolymer; and (2) block copolymers of a major amount of at least one monovinyl-substituted aromatic compound having from 8 to 12 carbon atoms per molecule and a minor amount of at least one conjugated diene having from 4 to 10 carbon atoms per molecule; and (3) mixtures thereof. Specific examples include copolymer of ethylene and 1,3-butadiene, copolymer of propylene and isoprene, copolymer of ethylene and isoprene, copolymer of decene-1 and 1,3-decadiene, block copolymer of 1,3-decadiene and 2-vinylnaphthalene, block copolymer of 1,3-butadiene and styrene, block copolymer of 1,3-butadiene and 3-methylstyrene, block copolymer of 1,3-pentadiene and 4-methylstyrene, and block copolymer of 1,3-hexadiene and 1-vinylnaphthalene. Block copolymers of this invention and their preparation are disclosed in British Pat. 895,980.

The cable core having the electroplatable polymer coating 13 thereon is then passed to step 24. Any suitable process for electroplating the synthetic thermoplastic material can be utilized. Conventional procedures generally involve a preplating process.

Conventional plating processes involve a preplating process which includes cleaning; conditioning or etching the surface of the plastic with a strong acid solution, such as chromic-sulfuric acid, at elevated temperatures; sensitizing the surface of the plastic with an oxidizable salt, such as stannous chloride, that is absorbed and later reduces the activator (not all conventional processes include this step); activating the surface with a precious metal salt, such as palladium chloride; and electroless plating with either copper (about 0.005 to 0.010 mil) or nickel about 0.010 to 0.030 mil). Each conditioning step is followed by one or more water rinses. The continuous film of electrically conductive material applied by the preplating process provides the capability for applying the final finish by conventional electrolytic processes. Following the preplate process, normal procedures for electroplating with copper, nickel, silver, or the like, are followed to provide the desired thickness of electrically conductive layer 14. For most applications the thickness of layer 14 will be in the range of about 1 mil to about 20 mils.

The shielded cable is then passed to step 25 wherein a lubricant or slip agent 15 is applied to the outer surface of layer 14. This prevents bonding of layer 14 to the subsequently applied layer 16 and permits greater flexibility of the cable without creating stress at the interface of layers 14 and 16 which would occur if they were cobonded. Suitable lubricants or slip agents include the fatty acids and their metal salts, such as stearic acid, aluminum stearate, zinc stearate, and the like, the amine fatty acids, petroleum wax, glycerine, silicone oil, and the like. The cable is then passed to step 26 wherein an outer sheath of a protective material, such as poly(vinyl chloride), polyethylene, and the like, is applied.

No detailed description is given of extrusion coating of wire because it is a well known technique, and is described, for example, in Modern Plastics Encyclopedia, 1968, pp. 764–765, published by McGraw-Hill, Inc.

The following example is presented in further illustration of the invention and should not be construed to unduly limit the invention.

EXAMPLE

Two lengths of No. 12 copper wire are extrusion-coated with 30-mil layers of polyethylene in side-by-side crosshead extrusion dies, cooled by passage through a 20-foot hot-water trough, dried under a bank of infra-red lamps, twisted, extrusion coated with a 35-mil layer of ethylene-butadiene copolymer made by the so-called "particle-form" process of British Pat. 853,414 from a monomer system containing 3 weight percent butadiene, cooled and dried as hereinbefore described, and electroplated by the following procedure:

(1) Immerse in a sodium pyrophosphate cleaning solution for 2 to 5 minutes at 140° F.

(2) Immerse in a sodium bisulfate neutralizing solution for 15 to 30 seconds at 75° F.

(3) Immerse in an acid chromate etching solution for 15 minute at 130° F.

(4) Rinse with 5 weight percent hydrochloric acid.

(5) Immerse in a stannous chloride sensitizing solution for 15 to 60 seconds at 75° F.

(6) Immerse in a palladium ammonium chloride activating solution for 15 to 60 seconds at 75° F.

(7) Immerse in an electroless copper plating solution for 5 to 30 minutes at 75° F. The plating solution comprises modified Fehling solutions: solution A was $CuSO_4$ and solution B was NaOH, NaK tartrate, $Na_2CO_3$ and $NaC_2H_3O_2$.

(8) Strike with copper. The composition of the copper strike bath and conditions for plating were as follows.

Composition of the copper strike bath:
    98 grams—$CuSO_4 \cdot 5H_2O$
    15.5 milliliters—concentrated $H_2SO_4$
    1 milliliter—UBAC Brightener No. 1[1]
    Sufficient water to make 1 liter of solution.

[1] Supplied by Odylite Corporation, Detroit, Mich.

Plating conditions:
    Voltage—2 volts D.C.
    Current density—10 to 15 amperes/$ft.^2$
    Current efficiency—100%
    Anode—electrolytic copper
    Temperature—75 to 80° F.
    Time—4 to 10 minutes
    Mechanical stirring of bath (9) Electroplate with bright copper. The composition of the bright copper bath and conditions for plating were as follows.

Composition of the bright copper bath:
    212 grams—$CuSO_4 \cdot 5H_2O$
    28.8 milliliters—concentrated $H_2SO_4$
    4 milliliters—UBAC Brightener No. 1
    75 milligrams—NACl
    Sufficient water to make 1 liter of solution.

Plating conditions:
    Voltage—4 volts D.C.
    Current density—30 to 40 amperes/$ft.^2$
    Current efficiency—98 to 100%
    Anode—electrolytic copper
    Temperature—75 to 80° F.
    Time—to 3 minutes
    Air agitation of the bath Each conditioning and plating step is followed by one or more water rinses. The finished 2-mil layer of metal consists of an 0.01-mil layer of electroless nickel and a second 1.99-mil layer of electrolytic copper.

Following the final water rinse the plated cable is dried under a bank of infra-red lamps, passed through a saturated solution of aluminum stearate in methyl alcohol, dried under a bank of infra-red lamps, and extrusion coated with a final 35-mil layer of polyethylene.

While the invention has been illustrated in terms of a cable core comprising a plurality of individually insulated conductors 11, a single conductor 11 or a plurality of conductors 11 without individual insulation 12 can be utilized.

Reasonable variations and modifications are possible within the foregoing disclosure, the drawings and the appended claims to the invention.

We claim:

1. A process for the fabrication of shielded electrical cable which comprises coating a cable core with at least one electroplatable polymer selected from the group consisting of copolymers of at least one aliphatic 1-olefin having from 2 to 8 carbon atotms per molecule with at least one diolefin having at least one terminal double bond and 4 to 10 carbon atoms per molecule, said copolymer having at least two trans-internal double bonds per thousand carbon atoms and block copolymers of a major amount of at least one monovinyl-substituted aromatic compound having from 8 to 12 carbon atoms per molecule and a minor amount of at least one conjugated diene having from 4 to 10 carbon atoms per molecule; and electroplating a layer of conductive metal onto the outer surface of the thus formed coating.

2. A process in accordance with claim 1 further comprising applying a lubricant to the outer surface of said layer of conductive metal and coating the thus lubricated layer with an outer sheath.

3. A process in accordance with claim 1 wherein the step of coating comprises extrusion coating said electroplatable polymer onto said cable core.

4. A process in accordance with claim 1 wherein said cable core comprises a plurality of individually insulated electrical conductors.

5. A process in accordance with claim 1 wherein said step of electroplating comprises conditioning the outer surface of said coating of electroplatable polymer, activating said surface with a precious metal salt, electroless plating a conducting metal onto the thus activated surface, and electroplating a layer of a conductive metal onto the thus formed electroless plated layer.

6. A process in accordance with claim 1 wherein said electroplatable polymer is a copolymer of ethylene and butadiene having at least two trans-internal double bonds per thousand carbon atoms.

References Cited
UNITED STATES PATENTS

| | | | |
|---|---|---|---|
| 2,707,703 | 5/1955 | Dorst | 204—28 |
| 2,745,898 | 5/1956 | Hurd | 204—38.42 |
| 2,802,897 | 8/1957 | Hurd et al. | 204—38.42 |
| 3,467,540 | 9/1969 | Schick | 204—29 |

DANIEL E. WYMAN, Primary Examiner

W. J. SHINE, Assistant Examiner

U.S. Cl. X.R.

204—29, 35, 38